(12) United States Patent
Tsai et al.

(10) Patent No.: US 8,436,797 B2
(45) Date of Patent: May 7, 2013

(54) DIGITAL PHOTO FRAME WITH MIRROR FUNCTION

(75) Inventors: Ming-Feng Tsai, Taipei Hsien (TW);
Cheng-Hao Chou, Taipei Hsien (TW);
Kuan-Hong Hsieh, Taipei Hsien (TW);
Xiao-Guang Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 991 days.

(21) Appl. No.: 12/479,695

(22) Filed: Jun. 5, 2009

(65) Prior Publication Data

US 2010/0231607 A1    Sep. 16, 2010

(30) Foreign Application Priority Data

Mar. 13, 2009    (CN) .......................... 2009 2 0301284

(51) Int. Cl.
*G06F 3/041* (2006.01)
(52) U.S. Cl.
USPC ............. 345/87; 345/102; 345/204; 345/207; 345/690; 40/714; 40/715; 40/700; 40/799

(58) Field of Classification Search ..................... 345/87, 345/102, 204, 207, 690; 40/700–799
See application file for complete search history.

(56) References Cited

U.S. PATENT DOCUMENTS

| | | | | |
|---|---|---|---|---|
| 5,736,973 A | * | 4/1998 | Godfrey et al. | 345/102 |
| 6,232,937 B1 | * | 5/2001 | Jacobsen et al. | 345/87 |
| 2006/0202942 A1 | * | 9/2006 | Fong | 345/102 |
| 2008/0066360 A1 | * | 3/2008 | Simon | 40/715 |
| 2008/0284720 A1 | * | 11/2008 | Fukutome | 345/102 |

* cited by examiner

*Primary Examiner* — Alexander S Beck
*Assistant Examiner* — Jeffrey Steinberg
(74) *Attorney, Agent, or Firm* — Altis Law Group, Inc.

(57) ABSTRACT

A digital photo frame (DPF) includes a power source, a power management unit, a display panel, a backlight unit, a touch sensing unit and a processing unit. The display panel includes a reflective structure. The power management unit is used to manage the power supply from the power source to the DPF. The touch sensing unit is used to produce a touch signal when detecting the DPF is touched by a user. The processing unit receives the touch signal, and controls the management unit to discontinue the power from the power source to the backlight unit, therefore display panel reflects images via the reflective structure.

2 Claims, 1 Drawing Sheet

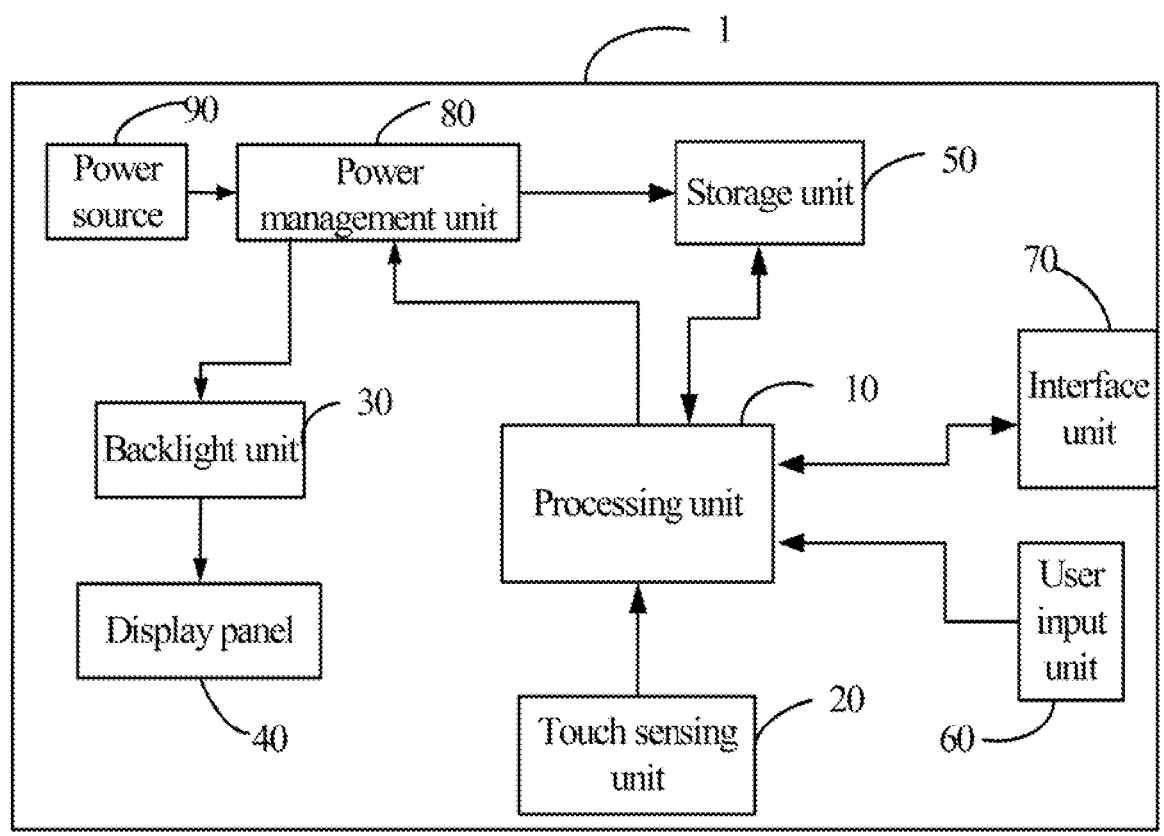

DIGITAL PHOTO FRAME WITH MIRROR FUNCTION

RELATED APPLICATIONS

This application is related to co-pending applications entitled, "DIGITAL PHOTO FRAME WITH MIRROR FUNCTION", filed Jun. 5, 2009, Ser. No. 12/479,696; and "DIGITAL PHOTO FRAME WITH MIRROR FUNCTION", filed Jun. 5, 2009, Ser. No. 12/479,697.

BACKGROUND

1. Technical Field

The disclosure relates to electronic devices and, particularly, to a digital photo frame.

2. Description of Related Art

Nowadays, digital photos are getting more and more popular while digital cameras are becoming more and more affordable. Accordingly, in order to display digital photos, digital photo frames (DPFs) are invented.

Like the traditional photo frames, many digital photo frames can be either placed on a table or mounted on a wall. Because of their popularity, it would be useful if digital photo frames could serve other purposes as well.

Therefore, it is useful to provide a digital photo frame with additional functionality.

BRIEF DESCRIPTION OF THE DRAWINGS

The components in the drawing are not necessarily drawn to scale, the emphasis instead being placed upon clearly illustrating the principles of the digital photo frame.

The drawing is a block diagram of a digital photo frame in accordance with an exemplary embodiment.

DETAILED DESCRIPTION

Referring to the drawing, a digital photo frame (DPF) 1 includes a processing unit 10, a touch sensing unit 20, a backlight unit 30, a display panel 40, a storage unit 50, a user input unit 60, an interface unit 70 (e.g., an input port or a wireless transceiver), a power management unit 80, and a power source 90.

The interface unit 70 is configured to connect to an external electronic device (not shown). The external device can be a storage card (e.g., a secure digital SD card, a compact flash CF card) or another electronic device (e.g., a digital camera, a mobile phone, or a computer).

The user input unit 60 is configured to generate instructions in response to user operations. The user input unit 60 can be input keys/buttons, knobs, and the like. The power management unit 80 is configured to distribute power from the power source 90 to elements of the DPF 1, such as the processing unit 10, the backlight unit 30 and the display panel 40.

The storage unit 50 is configured to store medias such as digital pictures. The display panel 40 is configured to display the medias. The backlight unit 30 is configured to illuminate the display panel 40 from the sides or back of the display panel 40. The backlight unit 30 can be one or more incandescent light bulbs, one or more light-emitting diodes (LEDs), an electroluminescent panel (ELP), one or more cold cathode fluorescent lamps (CCFL), or one or more hot cathode fluorescent lamps (HCFL), or the like.

In the exemplary embodiment, the display panel 40 is a multilayer panel. One layer other than the surface of the display panel 40 is plated with reflective material, such as, aluminum, bronze, and silver. The reflective material enables the display panel 40 to reflect images like a mirror when the backlight unit 30 is turned off.

In another embodiment, the surface of the display panel 40 is covered with a reflective film, the reflective film also comprises a multilayer structure and one layer excepting the surface of the reflective film is plated with reflective material. The layer of the reflective film can be an aluminum plated layer, a silver plated layer, a bronze plated layer, or the like.

The touch sensing unit 20 is connected to the processing unit 10, and configured to detect whether there is someone touching the DPF 1, and producing a touch signal to the processing unit 10 when someone touches the DPF 1. The touch sensing unit 20 includes at least one touch sensor, the touch sensor can be a capacitive touch sensor, a resistive touch sensor, a force-based touch sensor, or a surface acoustic wave touch sensor, or the like. The processing unit 10 is configured to control the power management unit 80 to discontinue the power from the power source 90 to the backlight unit 30 when receiving the touch signal. When the backlight unit 30 is turned off the display panel 40 can be used as a mirror. In the embodiment, the touch sensing unit 20 is located at a particular touch area with a symbol or characters to mark it, for example, the touch sensing unit 20 is located at a particular touch area labeled "mirror function". If someone touches the particular touch area, the touch sensing unit 20 outputs a touch signal. In another embodiment, the touch sensing unit 20 is capable of detecting a touch in a broader area on the DPF 1 and outputting the touch signal if the touch is not on the user input unit 60 of the DPF 1.

The processing unit 10 may also be configured to control the power management unit 80 to resume power to the backlight unit 30 after a predetermined time has elapsed after having received the touch signal and turned off the backlight 30. The display panel 40 accordingly displays the media again when there is nobody right before the DPF 1 seeking to see their reflection.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A digital photo frame (DPF) comprising:
    a power management unit connected to a power source, configured for distributing power from the power source to the DPF;
    a display panel comprising a reflective structure, wherein, the reflective structure is a reflective film covering the display panel, the reflective film comprises a multilayer structure and one layer except the surface of the reflective film is plated with reflective material;
    a backlight unit connected to the power management unit, configured for illuminating the display panel after being turned on;
    a touch sensing unit configured for detecting whether the DPF is touched by a person and producing a touch signal when the DPF is touched by the person; and
    a processing unit connected to the touch sensing unit, configured for controlling the power management unit to discontinue power from the power source to the backlight unit once receiving the touch signal;

wherein, the display panel reflects an image of the person via the reflective structure when the backlight unit is turned off due to the power being discontinued to the backlight unit.

2. The DPF of claim 1, wherein the reflective material is selected from the group consisting of aluminum, bronze, and silver.

\* \* \* \* \*